Feb. 25, 1947. F. H. MAGNUS 2,416,451
METHOD OF AND MOLD FOR MAKING INTEGRAL REED PLATES AND REEDS
Filed Feb. 11, 1944 2 Sheets-Sheet 2
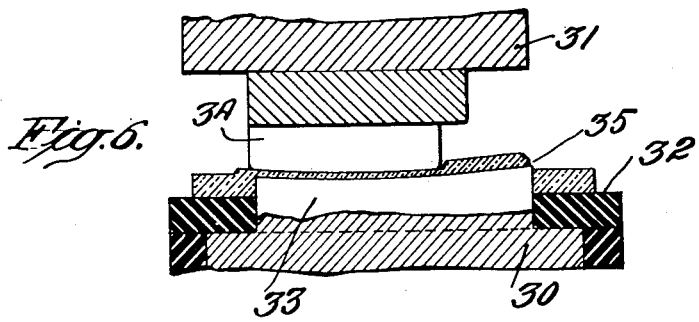
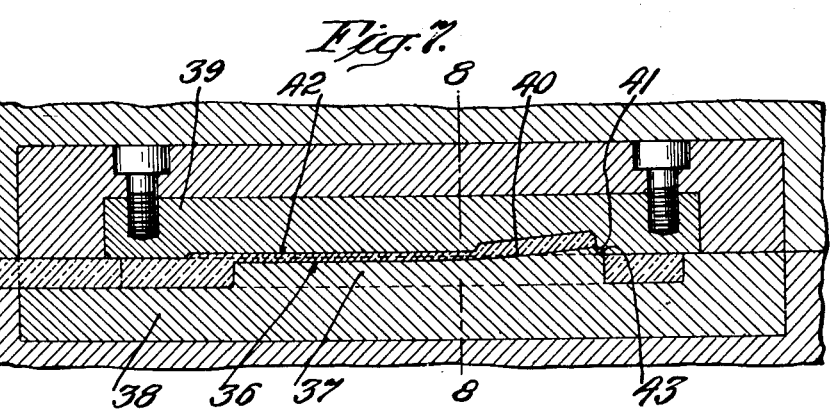
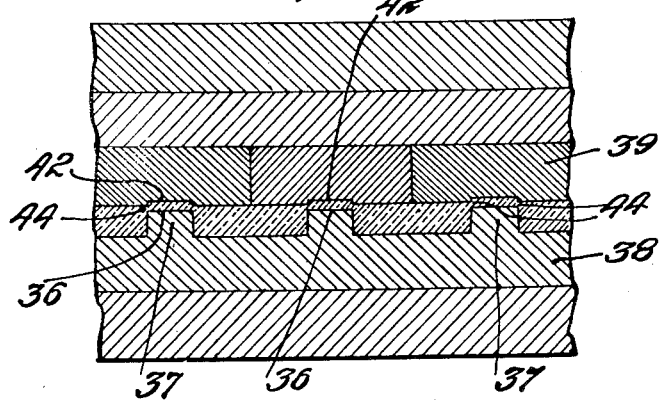
INVENTOR.
FINN H. MAGNUS
BY
ATTORNEY

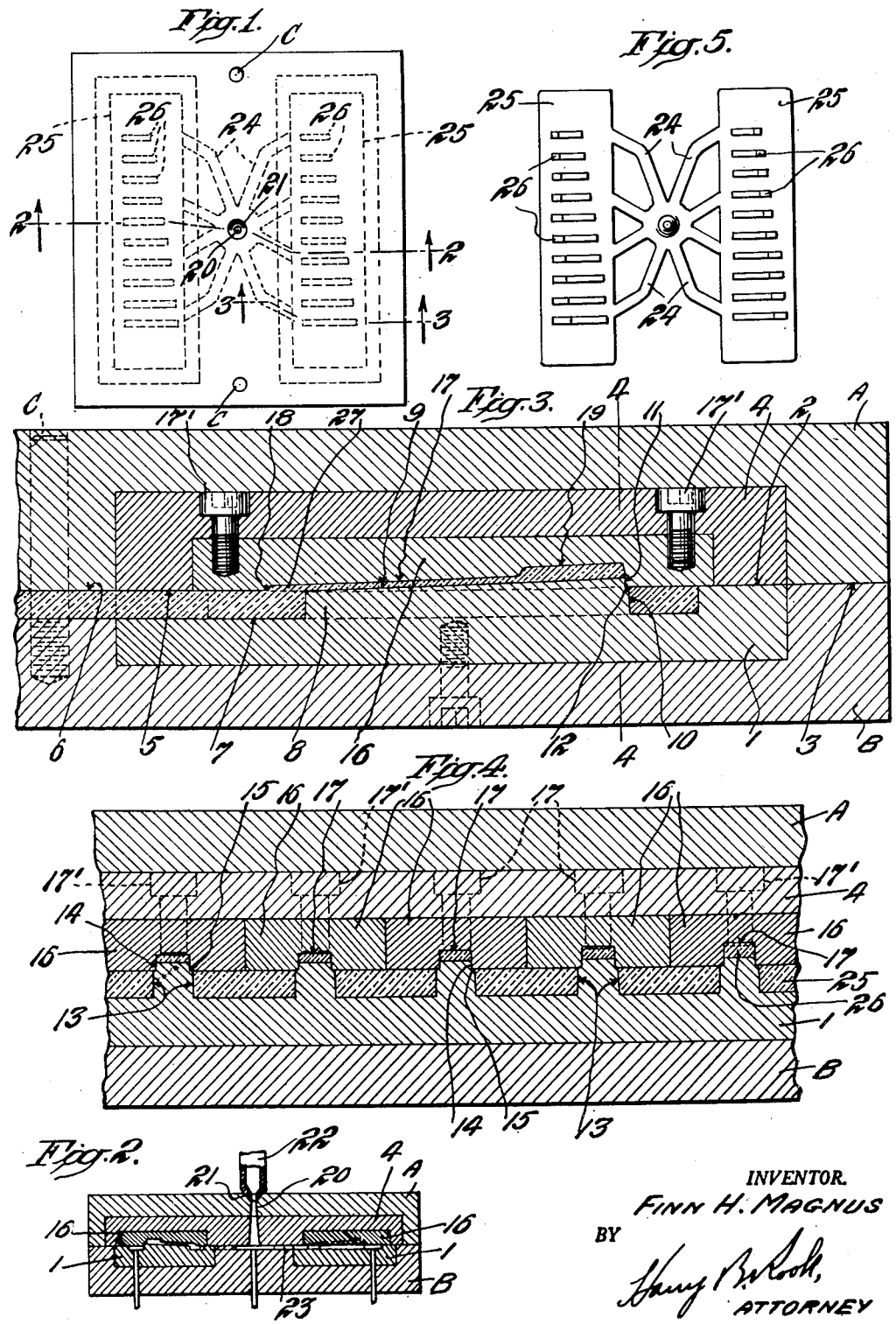

UNITED STATES PATENT OFFICE 2,416,451

METHOD OF AND MOLD FOR MAKING INTEGRAL REED PLATES AND REEDS

Finn H. Magnus, Glen Ridge, N. J., assignor to International Plastic Harmonica Corporation, Newark, N. J., a corporation of New Jersey Application February 11, 1944, Serial No. 521,940

2 Claims. (Cl. 18—42)

This invention relates in general to musical instruments of the reed type and particularly to such instruments having a plurality of reeds, for example harmonicas and accordions.

In my copending applications Serial No. 467,679, filed December 3, 1942, and Serial No. 476,517 filed February 20, 1943, I have described and claimed reeds and reed plates molded integrally of suitable plastic materials for example, polystyrene.

As is well known, the reed must be rigidly connected at one end to the support or reed plate in overlying relation to the reed slot and with the other end and the side edges of the reed in closely spaced but freely relatively movable relation to the corresponding walls of the reed slot.

This structure presents a difficult problem in molding and the prime object of the present invention is to provide a method of and a mold for integrally molding particularly of thermoplastic materials, one or more parts, such as a reed, and a support therefor, such as a reed plate, having an opening or recess therein, such as a reed slot, so that said part may freely move in said opening or recess in the support and the edges of said part and the walls of said opening shall be smooth and devoid of burrs or fins.

Another object is to provide a method of and mold for integrally molding a reed and a support or plate therefor having a reed slot, wherein two mold sections, or a die and a matrix shall cooperate in a novel and improved manner to integrally mold one end of the reed and said plate and to mold the other portions of the reed and the plate in predetermined spaced and unconnected relation to each other, whereby the complete molded article shall have the reed freely movable into and out of said slot and the edges of said reed and the edges of said slot shall be smooth and devoid of molding "flash."

Other objects are to provide a novel and improved method of and mold for molding in one piece a reed plate with slots and corresponding reeds, in a single operation and with the reeds of such thickness and shape as to be in tune and arranged according to the respective positions of their tones in the musical scale; to provide such a method and mold whereby combinations of reed plates and reeds of high quality can be produced at relatively low cost; and to obtain other advantages and results that will be brought out by the following description in conjunction with the accompanying drawing in which Figure 1 is a top plan view of a mold embodying the invention.

Figure 2 is a transverse vertical sectional view on the line 2—2 of Figure 1.

Figure 3 is a greatly enlarged fragmentary vertical sectional view on the line 3—3 of Figure 1.

Figure 4 is a vertical sectional view on the line 4—4 of Figure 3,

Figure 5 is a top plan view of the molded article produced in the mold shown in Figure 1 and including two reed plates with a plurality of reeds integrally molded on each thereof.

Figure 6 is a fragmentary vertical longitudinal sectional view showing the step in the method and the apparatus for properly locating the reed in the slot after the molding operation.

Figure 7 is a fragmentary view similar to Figure 3 showing a modification of the invention.

Figure 8 is a view similar to Figure 4 taken on the line 8—8 of Figure 7, and

Figure 9 is a fragmentary vertical longitudinal sectional view through the reed plate after the side edges of the reeds as shown in Figure 8 have been severed from the side walls of the reed slot.

While different types of molding apparatus may be utilized in carrying out the invention, I prefer to use the so-called plastic injection molding machine wherein the molten plastic material is injected into the mold cavity under pressure.

Specifically describing the illustrated embodiment of the invention the mold comprises two sections A and B which may be mounted in any desired manner upon supporting means (not shown), and be provided with suitable means for moving the sections A and B toward and from each other in the generally known manner. Suitable means such as guide pins C may be provided for holding the mold sections against relative lateral movement.

The mold has been shown for producing simultaneously two reed plates and the associated reeds and one mold section, in this instance the section B, has a mold block 1 inserted therein for each reed plate, said blocks being disposed in spaced and parallel relation to each other and with their faces 2 flush with the face 3 of the mold section. The other mold section A has a mold block 4 inserted therein complemental to each block 1 with its face 5 flush with the face 6 of the section A. In operation of the mold, the faces 2 and 5 of the mold blocks 1 and 4 accurately and tightly contact with each other during the molding operation to prevent escape of the molding material therebetween.

The mold block 1 has a molding recess 7 of perimetral dimensions and thickness corresponding to those of the reed plate to be molded, and projecting into said recess in spaced and parallel relation to each other and transversely of the recess are a plurality of projections 8, each corresponding to one of the reeds to be formed. Obviously these projections will be arranged in spaced relation corresponding to the desired spacing in the reeds. The projections correspond in length to the respective reeds and are relatively arranged according to the respective positions of their tones in the musical scale. One end of the top surface of each projection is flush with the face 2 of the corresponding mold block 1 and said surface 9 is inclined outwardly of the recess 7 to a point substantially above said face 2. The other end of the projection has a surface 10 which extends from the bottom of the molding recess 7 to the face 2 of the mold block and another surface 11 which is offset inwardly of the projection from the surface 10 to provide a shoulder 12 in the plane of the face 2 of the mold block. Each side of each projection 8 has a surface 13 which extends from the base of the molding recess 7 to the plane of the face 2 of the mold block and a surface 14 which is offset inwardly from the surface 13 above the face 2 of the mold block so as to form a shoulder 15 in the same plane with the shoulder 12 and the mold block face 2.

The portion of each projection 8 below the mold block face 2 serves to form the reed slot in the reed plate for the corresponding reed, while the portion of each projection 8 above the mold block face 2 cooperates with the other mold block 4 to form the reed and provide the clearance between the edges of the reed and the side walls of the slot. Preferably all of the surfaces of each projection 8 are inclined to provide the desired draft for removal of the molded article from the mold.

The mold block 4 serves as a matrix and preferably, but not necessarily, has a separate part 16 for each reed separably secured in the block as by screws 17', said parts being arranged in snugly contacting parallel relation to each other and with their faces in the same plane with the face 5 of the mold block. Each mold part 16 has a cavity 17, the length and width of which corresponds to the length and width of one reed. The width and length of the recess 17 also corresponds to the width and length of the portion of the corresponding projection 8 above the face of the mold block 1 and the depth of the recess is such that when said portion of the projection 8 projects into the recess, a mold cavity will be formed of a depth corresponding to the thickness of the respective reed.

One end of the recess 17 is located beyond the end of the corresponding projection 8 which is flush with the mold block face 2, as indicated at 18, to provide communication between the molding recess 7 and the molding recess 17, while the other end of the recess 17 is coincident with the surface 11 of the projection 8. Adjacent the last-mentioned end of each recess 17 is a sub-recess 19, said recesses 19 differing in depth according to the length of or the tone to be produced by the corresponding reed.

The dimensions of the molding recesses and the projections 8 may vary according to the nature of the plastic material being molded as well as the size of the reed plate and reeds being produced, but preferably the depth of the molding recess 7 will be about .052" which corresponds to the thickness of the reed plate, the depth of the molding recess 17 which corresponds to the thickness of the reed may be from .010" to .026" and the depth of the sub-recesses 19 which correspond to the thickness of the vibrating end of the reed may be from .013" on the short or "high-toned" reeds to .075" for the long or "low-toned" reeds.

Any suitable plastic material may be utilized which has the required properties of resiliency, strength, moisture resistance, resonance, capability of producing sound upon vibration, etc. Preferably thermoplastic materials are utilized, for example, materials of the nature of "polystyrene" and cellulose acetate.

For injecting the molten plastic material into the mold cavity, one of the mold sections, in the present instance the section A may have a passage or sprue 20, the outer end of which may have a seat 21 to receive the extrusion nozzle 22 of a known type of injection molding machine; and the other mold section 2 may have a plurality of channels 23 in its face that abuts the face of the section A for leading the plastic material from the passage 20 into the mold cavities formed by the molding recesses 7 and 17. In operation of the mold, the mold sections A and B are moved toward each other to bring their faces 3 and 5 into tight abutting contact as shown in Figures 2, 3 and 4, whereupon molten plastic material is forced into the mold cavities under pressure in the usual way. The temperature of the plastic material does not appear to be critical but where "polystyrene" is used, it is desirable to maintain the temperature thereof in the mold cavity at about 375° F. The molded article is taken from the mold while hot and allowed to cool. The article as it is removed from the mold appears as shown in Figure 5, the portions 24 being the plastic material that lay in the grooves 23 in the mold.

The parts 25 are the reed plates, each of which has a plurality of reeds 26 integrally molded thereon at their root ends as indicated at 27 in Figure 3. The other end and the side edges of each reed are in predetermined spaced and unconnected relation to the respective walls of the corresponding reed slot which is formed by one of the projections 8.

The edges of the reeds and the walls of the reed slots formed according to the invention are smooth and devoid of the usual molding "flash," burrs or fins. Also, the edges of the reeds have the required clearance from the sides of the reed slots. All of this is primarily due to the molding of the reeds above the surface of the reed plate in the molding recesses 17 which is made possible in the particular apparatus illustrated by the construction and relationship of the portions of the projections 8 above the face of the mold block 1 and the accurate cooperation therewith of the side and end walls of the molding recesses 17.

It will be observed that when the molding operation is completed, the reed will be disposed above the plane of the side of the reed plate to which the reed is connected as shown in Figure 3, and it is desirable that the side edges of the reed be brought into closer relationship to the side edges of the reed slot 10 so as to ensure proper flow of air between the reed and the reed slot. The reed may be subjected to the action of two dies 30, and 31, one of which, in the present instance the die 30 has a supporting surface 32 for the reed plate and a projection 33 to enter the reed slot and underlie the underside of the reed. The other die has a projection 34 to abut the top side of the reed and to press it into the reed slot as shown in Figure 6, so that the side edges of the reed will be in opposed relation to the corresponding side walls of the reed slot and spaced as closely thereto as is consistent with free vibration of the reed in the slot. The free end of the reed is preferably spaced from the corresponding end walls of the reed slot and above the corresponding side of the reed plate as indicated at 35 to permit flow of air between the reed and the reed slot sufficient to initiate vibration of the reed. This step of the method and the dies are described and claimed in my copending application Serial No. 521,941 filed February 11, 1944. The dies may be heated or the reed may be pressed while it is warm, e. g. after it has been removed from the mold.

If desired, the reed may be initially molded in approximately the position shown in Figure 6 by constructing the die blocks as shown in Figures 7 and 8 so that the top surface 36 of the projection 37 which corresponds to the projection 8 is below the plane of the meeting faces of the die blocks 38 and 39 except adjacent one end that corresponds to the free end of the reed to be molded, which is inclined upwardly at 40 to a point slightly above the meeting faces of the die blocks. Said end of the projection 37 has an offset surface 41 and a shoulder 42 corresponding to the surface 11 and shoulder 12 of the mold block shown in Figure 3 and for the same purpose. The bottom of the molding recess 43 is disposed slightly above the meeting surfaces of the mold blocks and extends beyond the end of the projection 37 opposite the surface 41 in a manner similar to that in which the recess 17 extends beyond the end of the projection 8 as indicated at 18 in Figure 3. The width of the recess 42 is slightly less than the width of the top of the projection 37 and the side walls of the recess 42 tightly engage the portions of the sides of the projection 37 that project above the meeting faces of the mold blocks, i. e. adjacent the inclined portion 40 of the top of the projection.

The molten thermoplastic material is injected into the mold cavity in the same manner as described in conjunction with the mold shown in Figures 2 to 4 inclusive, and the completed molded article will have the sides of the reed integrally connected to the reed plate at the edges of the reed slot as indicated at 44, except in the zone where the side walls of the recess 42 tightly engage the side walls of the projection 37 along the inclined end 40 of said projection. Thereafter said side edges of the reed may be severed from the side walls of the slot by any suitable cutting operation as indicated at 45 in Figure 9 so that the side edges of the reed will be free from the walls of the reed slot and the end of the reed which was formed by the inclined portion 40 of the projection 37 and corresponding portions of the recess 42 will be free from the corresponding end of the reed slot and spaced slightly above the plane of the side of the reed plate to which the reed is mounted.

While I have shown two preferred embodiments of the invention it should be understood that this is primarily for illustrating the principles of the invention and that many modifications and changes may be made in the method and the mold within the spirit and scope of the invention.

What I claim is:

1. The method which comprises molding a flat body with an elongate slot therein and a part aligned and substantially coextensive with said slot, said part being integrally connected to said body at one end only of said slot and positioned outside the plane of said body, removing said body from the mold, and thereafter pressing a portion of said part intermediate its ends into said slot and positioning it with its edges in closely spaced relation to the walls of the slot.

2. A mold for molding a reed plate having a slot and an integral reed overlying said slot, comprising a section having a recess shaped to form a flat body and a projection extending upwardly from the bottom of the recess to form a slot in said body, and a complemental section having a recess in overlying relation to said projection with its bottom spaced from the top of the projection to form a reed, one end portion of said last-mentioned recess being shaped to snugly fit against one end portion of said projection, the other end portion of said last-mentioned recess extending beyond the other end of said projection whereby the recesses in the two sections communicate with each other only at said other end of the projection, said recesses forming a mold cavity between said sections, one section having an inlet for injection of molding material into said cavity.

FINN H. MAGNUS.

REFERENCES CITED

The following references are of record in the file of this patent:

UNITED STATES PATENTS

| Number | Name | Date |
| --- | --- | --- |
| 2,266,887 | McCoy | Dec. 23, 1941 |
| 2,181,142 | Marinsky | Nov. 28, 1939 |